Jan. 3, 1967  J. H. MILLER  3,295,851
ROTATABLY ACTUATED RACING GAME

Filed March 3, 1964  4 Sheets-Sheet 1

INVENTOR
Joseph H. Miller
BY Thomas W. Y. Clark
ATTORNEY

Jan. 3, 1967 J. H. MILLER 3,295,851
ROTATABLY ACTUATED RACING GAME
Filed March 3, 1964 4 Sheets-Sheet 2

INVENTOR
Joseph H. Miller
BY Thomas W.Y. Clark
ATTORNEY

Jan. 3, 1967  J. H. MILLER  3,295,851
ROTATABLY ACTUATED RACING GAME
Filed March 3, 1964  4 Sheets-Sheet 3

INVENTOR
Joseph H. Miller
BY Thomas W. Y. Clark
ATTORNEY

Jan. 3, 1967 J. H. MILLER 3,295,851
ROTATABLY ACTUATED RACING GAME
Filed March 3, 1964 4 Sheets-Sheet 4
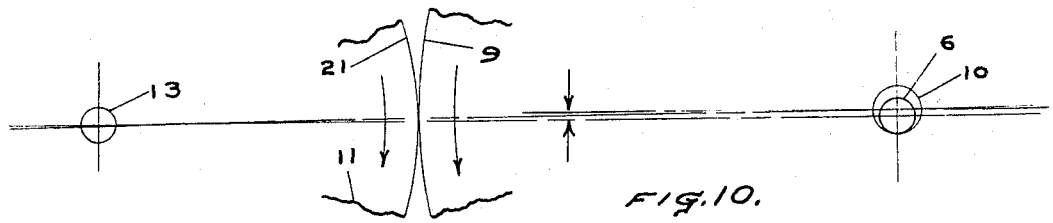
FIG.10.
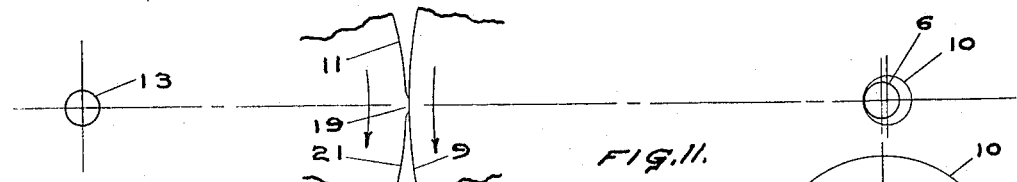
FIG.11.
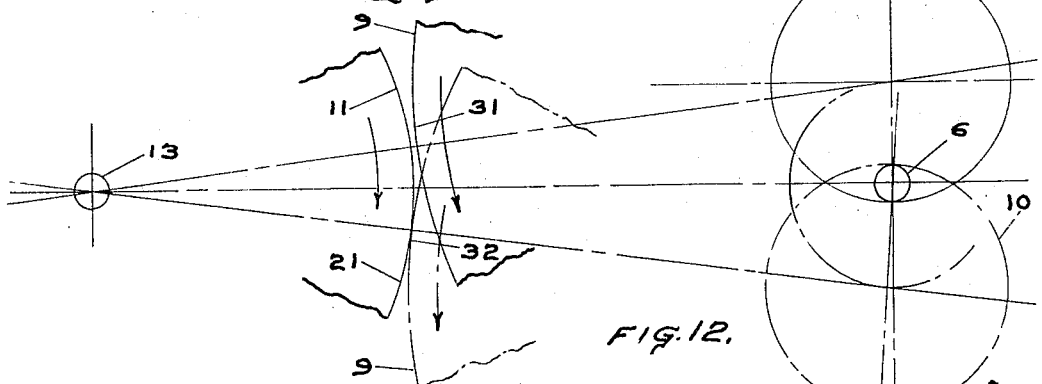
FIG.12.
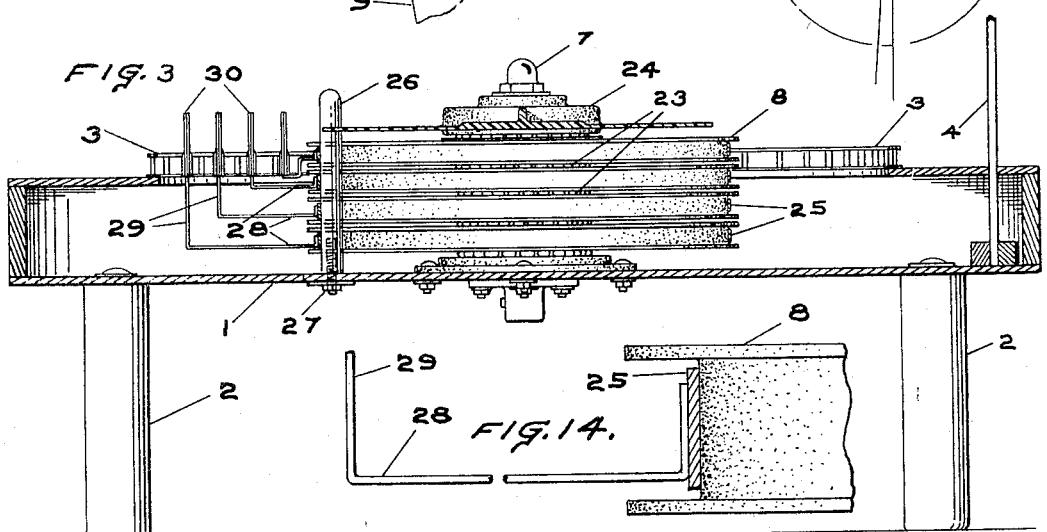
FIG.3
FIG.14.
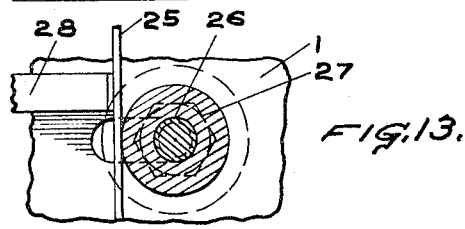
FIG.13.
INVENTOR
Joseph H. Miller
BY
ATTORNEY

United States Patent Office 3,295,851
Patented Jan. 3, 1967

3,295,851
ROTATABLY ACTUATED RACING GAME
Joseph H. Miller, 2824 Overland Ave.,
Baltimore, Md. 21214
Filed Mar. 3, 1964, Ser. No. 349,045
13 Claims. (Cl. 273—86)

This invention relates to a racetrack or racing board carrying a plurality of racing members such as horses and riders around a set course and in which, although the elements propelling each racing member are identical, their progress around the course cannot be foretold or prearranged so that which one may win a given race is uncertain until the end of the race.

An object of the invention is to provide a racetrack where the outcome of the race is uncertain. The members may move at variable rates of speed or at the same rate of speed. Some members may pass other members even though the last to start in the race. The object of the invention is to set the members abreast of each other at a given point and to propel them around their course with the result of which one will arrive at the finishing point always uncertain and yet the component parts to propel each racing member are the same. The propelling means for each racing member goes the same distance around the course.

Another object of the invention is to give realism to the track by using a signal for the start of the race and then the race may be started and when the leading member has finished the course all may be stopped, or they may be moved until the last one has finished the course, for purposes of determining the various positions of particular horses as to the positions of win, place and show.

Other objects and advantages of the invention will be apparent from the following description and the accompanying drawings forming a part hereof and in which:

FIGURE 3 is an irregular vertical sectional view on line 3—3 of FIGURE 2.

FIGURE 10 is a fragmentary schematic view indicating the normal contact of a drive wheel with a driven pulley.

FIGURE 11 is a similar view showing the engagement of a drive wheel with a longer radius arc, or knob, with the driven pulley.

FIGURE 12 is a further schematic view illustrating the restoration of the driving contact with the drive wheel and the driven pulley.

FIGURE 13 is a fragmentary sectional view illustrating a belt extender and its coaction with a belt.

FIGURE 14 is a fragmentary vertical sectional view showing the attachment of a racing member bracket to a belt.

In the drawings similar numerals refer to similar parts throughout the several views.

Figure 1:
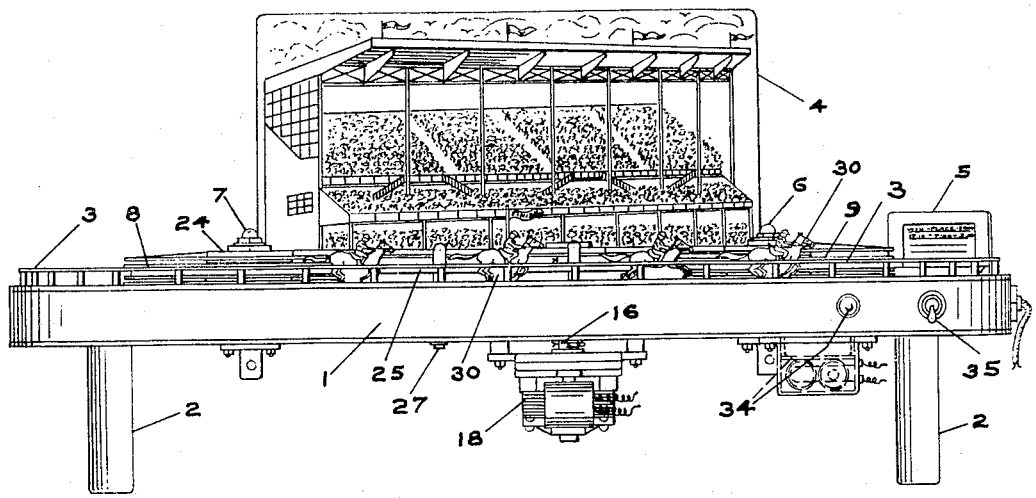
FIGURE 1 is a front elevational view of the racetrack showing the stand filled with spectators.
Figure 2:
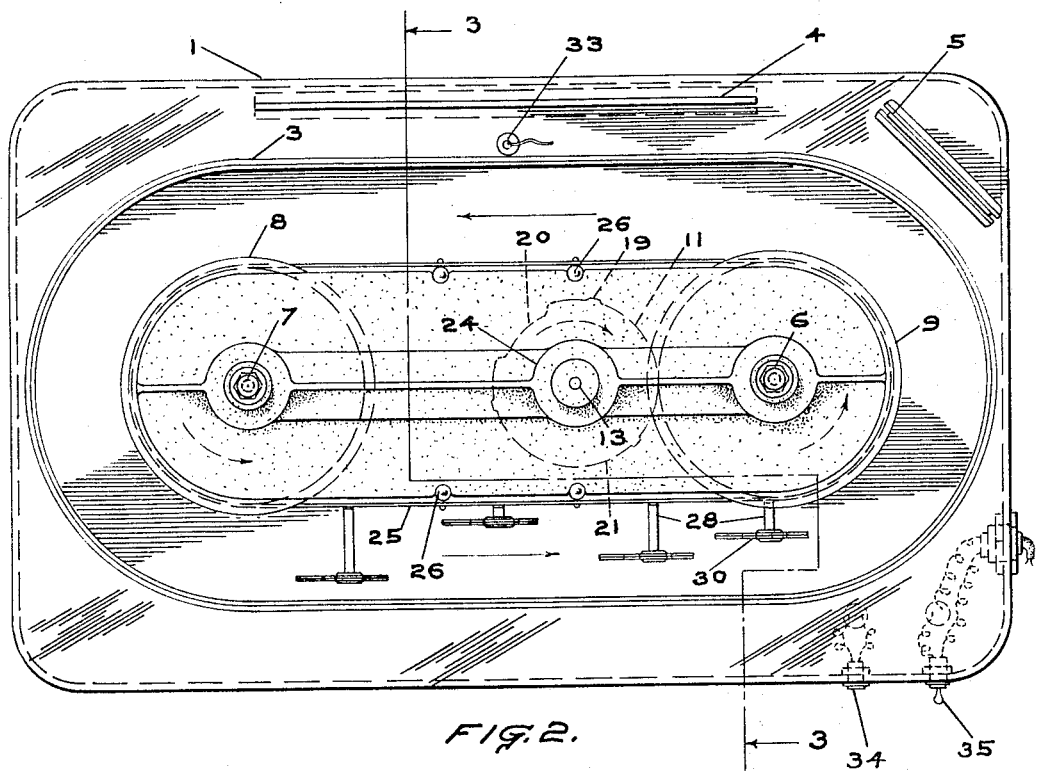
FIGURE 2 is a top plan view of the track.
Figure 6:
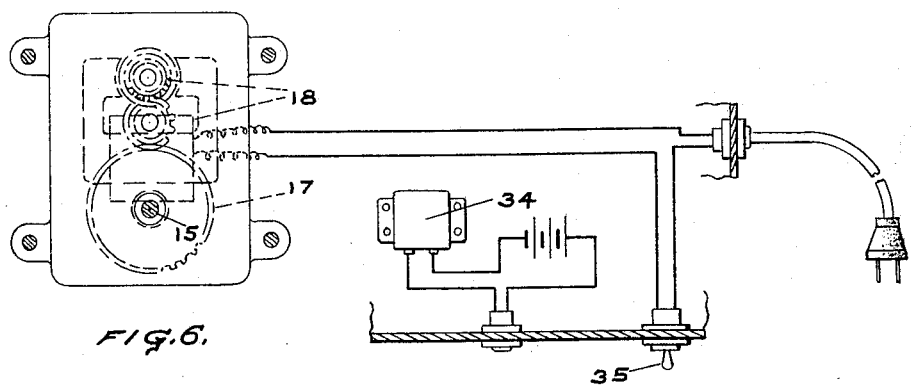
FIGURE 6 is a fragmentary horizontal sectional view showing the driving motor and signal apparatus.

The racing platform or board 1 is preferably mounted on feet 2 and has therearound a railing member 3 and a pictured grandstand 4 full of spectators. There may also be an odds board 5.

Figure 4:
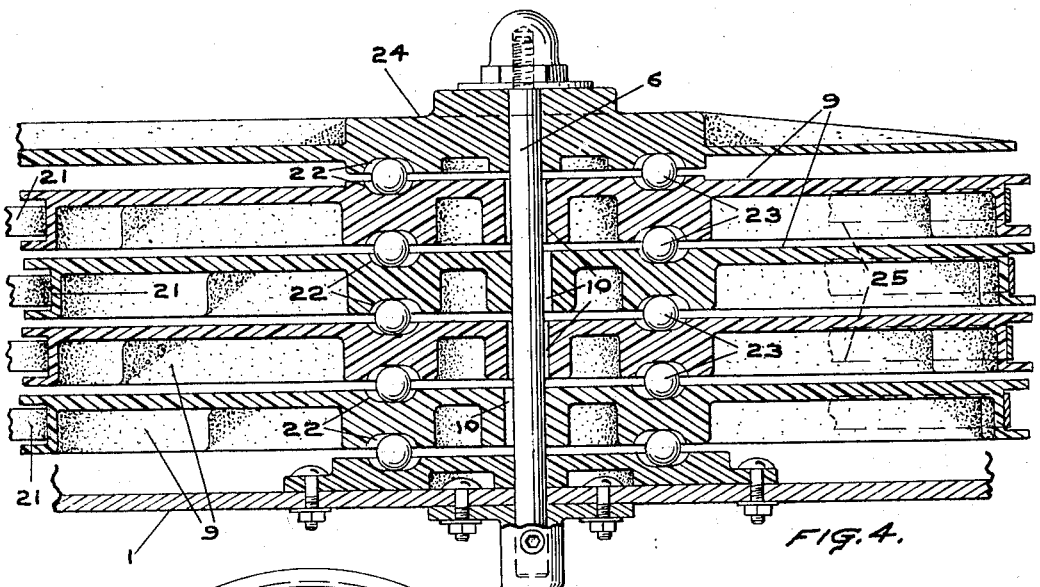
FIGURE 4 is a fragmentary vertical sectional view showing the driven pulleys.
Figure 7:
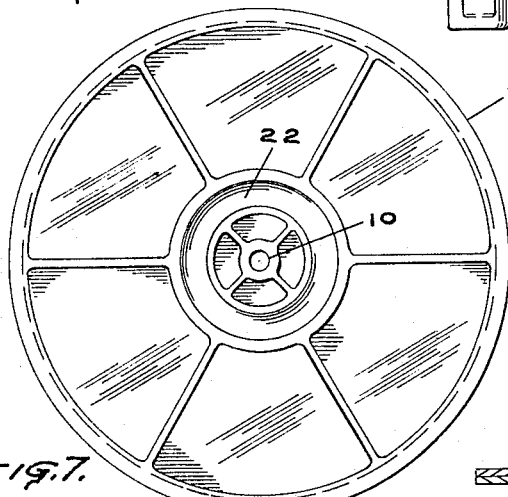
FIGURE 7 is an inverted plan view of one of the driven pulleys.
Figures 15, 16:
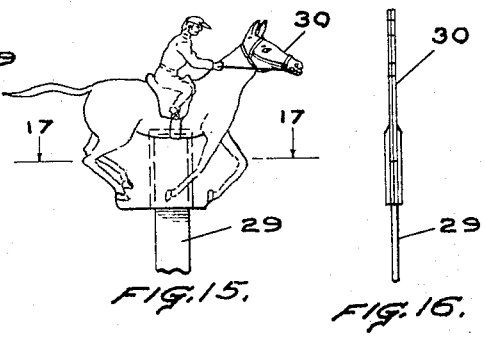
FIGURE 15 is a side elevational view of one of the racing members attached to its carrying bracket.
FIGURE 16 is a front elevational view of the racing member attached to its bracket.
Figure 17:
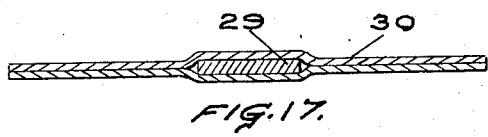
FIGURE 17 is a horizontal sectional view on line 17—17 of FIGURE 15.
Figure 8:
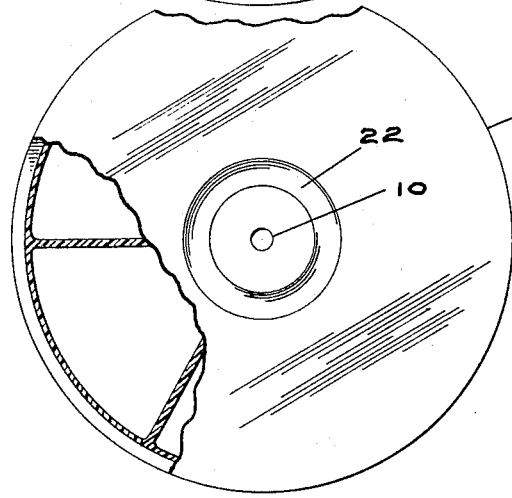
FIGURE 8 is a top plan view of one of the driven pulleys partly in section.

The track is preferably oval in a rectangular base and it has near one end an upstanding spindle 6 and at the other end a similar upstanding spindle 7. Both spindles carry the same number of similarly horizontally spaced pulleys which have grooves between their faces as shown in FIGURES 3 and 4. The pulleys 8 are mounted for free rotation and spaced from each other on their spindle 7. The pulleys 9 on spindle 6 have similar grooves to those on spindle 7 but their spindle openings 10 are considerably larger than the spindle 6 to allow bodily movement of the pulley on the spindle as illustrated in FIGURES 4, 10, 11 and 12.

The drive wheels 11 are preferably molded as a single unit with a hub 12 mounted on a shaft 13 and held thereon by cotter pin 14, the shaft 13 being slotted at its bottom and receiving therein a tongue on the end of the driving shaft 15 mounted in gear 17 driven by electric motor and reduction gear 18. A sleeve 16 having cotter pins therethrough and through shafts 13 and 15 hold the assembly together.

The driven wheels 11 each have thereon similarly spaced around their periphery a plurality of knobs 19 and notches 20. These are simply portions or arcs having a greater and less radius respectively than the principal driving surface 21 of the driven wheels 11. These driving surfaces contacting the driven pulleys 9 in their grooves are best shown in FIGURE 5.

The knobs and notches on each of the drive wheels are identical and are positioned on the periphery of the drive wheels, immediately one above the other.

The pulleys 9 have on both their faces and adjacent their centers, races 22 carrying balls 23 therein to maintain the pulleys horizontal and to minimize friction therebetween. As shown in FIGURE 4 it will be seen that the races 22 are wide horizontally to allow for the free horizontal movement of the pulleys 9 about their spindle, and the adjacent rotating pulleys will have some effect in causing their adjacent pulley to move inwardly due to the pull of the belts and to assume the position of least strain. Spacing member 24 extends between the spindles 6 and 7 to hold them firmly apart. Also shaft 13 has a bearing in this member 24, as illustrated in FIGURE 5.

Figure 5:
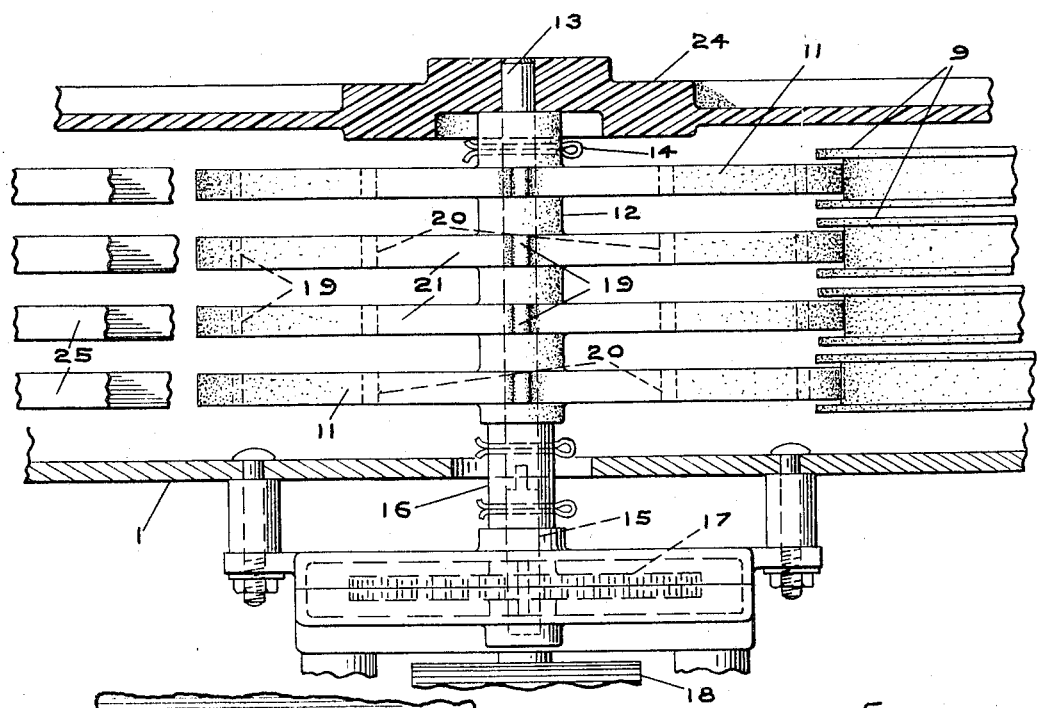
FIGURE 5 is a similar view showing the driving wheels.
Figure 9:
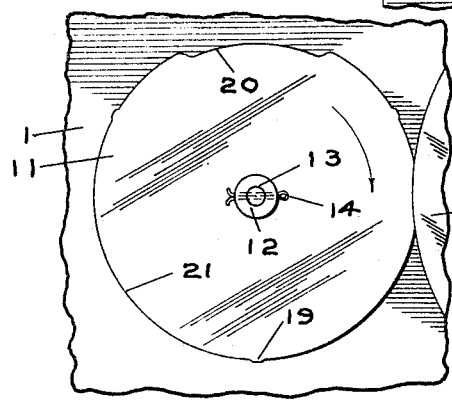
FIGURE 9 is a top plan view of a driving wheel engaging a driven pulley.

The belts 25 connect corresponding horizontally positioned pulleys 8 and 9 as best illustrated in FIGURES 3 and 5. These belts are maintained under reasonable tension to pull the two sets of pulleys towards each other but yet not so much tension that the pulleys 9 may not be pushed out by the knobs 19 on the drive wheels. Belt extenders 26 are spaced between the sets of pulleys in the track 1 and held by nuts 27 to keep the belts reasonably taut on their mounting pulleys.

Each pulley belt has thereon preferably attached by cement a bracket 28 extending horizontally from the pulley with an upstanding arm 29. On these arms 29 are mounted figures of race horses with riders 30. The brackets 28 extend outwardly an increasing amount on each lower belt and arms 29 are increasingly longer so that the tops of the arms are all on the same horizontal level as shown in FIGURE 3, and thereby mount their horses and riders on a plane with the top of platform 1, as shown in FIGURE 1.

As shown in FIGURE 10 when the normal driving circumference 21 of the drive wheel 11 engages the groove of the pulley 9, the spindle 6 occupies a position in the pulley opening 10 allowing for the pulley to be either pushed or pulled from or toward the drive wheel 11, the pulley is off center with respect to its spindle by the space between the horizontal lines as indicated by the arrows.

As shown in FIGURE 11 the pulley 9 has been pushed against the spindle 6 thereby increasing the belt tension causing more positive traction between the knob and pulley contacting surfaces allowing for the belt and its respective horse to be moved forward in a more positive manner without chance of slippage of the drive elements. The greater length of the radius of knob 19 will slightly increase the speed of the pulley 9.

FIGURE 12 illustrates an exaggerated view of FIGURE 10, in which opening 10, in solid and greatly enlarged lines contacts spindle 6 on the lower side of the spindle as shown in the drawing. In this position, pulley 9 has light or no contact with drive wheel 11, as shown at 31. When pulley 9 moves around for opening 10 to contact the other side of spindle 6, as shown by the broken lined circles, firm contact with drive wheel 11 is established. The partial broken circle shows that both openings 10 are the same distance from the spindle 6 center.

In the rotation of the drive wheel, when a notch 20 comes opposite the groove of the driven pulley, the driven pulley stops, the notch being so deep that even enlarged opening 10 does not allow for driving engagement.

Since the notches 20 come at a corresponding vertical position in all the drive wheels, they will disengage the driven pulley at the same time. In this position the belts can be pulled by hand to position the racing members in a line opposite the starting pole 33. When they are so positioned the race may be begun by first producing the buzzing sound with the signal member 34, and then turning the switch 35 to start the motor and reduction gear 18 to start the race.

It will be apparent that each driving mechanism contains identical drive wheels 11 and with equal length belts 25, give each racing member an equal chance for making the circuit first but it will also be apparent that the enlarged openings 10 in the driven pulleys allow these pulleys to operate independently of each other so that any racing member will tend to move forward and to get out of line with the others and they may be spaced around the track in an erratic manner, uncontrollable by the operator. It is preferred that two trips around the track be used for each race, but it will be apparent that any number may be adopted.

It will also be apparent that many modifications may be made in the construction shown without departing from the spirit of the invention as set forth in the following claims.

What is claimed as new and is desired to be secured by Letters Patent is:

1. A racetrack comprising a horizontal generally rectangular base, upstanding spindles at each end thereof, a plurality of freely rotatable similarly horizontally spaced pulleys on each spindle, belts connecting each pair of correspondingly horizontally spaced pulleys, an upstanding spindle having horizontal drive wheels fixed thereon, the peripheries of which engage the pulleys on one spindle to drive them, means to drive said wheel spindle at a substantially uniform rate, the driven pulleys having therein spindle openings substantially larger than the maximum cross sectional dimension of the portion of the mounting spindle passing through said pulleys said drive wheels having portions of varying radii to engage and disengage the driven pulleys, the driven pulleys moving bodily to vary their engagement with the drive wheels, racing members on said belts projecting thereabove and being moved irregularly around the track by said drive means.

2. The racetrack of claim 1 in which all the belts have the same length.

3. The racetrack of claim 1 in which all the driven pulleys have the same radius.

4. The racetrack of claim 1 in which the drive wheels are between the pulleys and the belts pull the pulleys on opposed spindles toward each other.

5. The racetrack of claim 1 in which the drive wheels engage the driven pulleys between the runs of the belts.

6. The racetrack of claim 1 includling means to maintain the horizontal spacing of the driven pulleys.

7. The racetrack of claim 1 including circular races in the faces of adjacent driven pulleys and balls in the races to maintain the horizontal spacing of the pulleys.

8. The racetrack of claim 1 including upstanding belt extenders between the pulleys bearing on the belts to maintain their driving engagement with the driven pulleys.

9. The racetrack of claim 1 including spacers between the tops of the pulley spindles to maintain their horizontal spacing.

10. The racetrack of claim 1 in which the respective racing members are spaced horizontally different distances from the belts to avoid colliding with one another throughout their travel.

11. The racetrack of claim 1 in which the drive wheels are mounted as a unit on their spindle.

12. The racetrack of claim 1 in which the varying radii around the periphery of all the drive wheels is the same.

13. The racetrack of claim 1 in which varying radii in each of the drive wheels is vertically aligned with similar varying radii in each of the other drive wheels.

References Cited by the Examiner

UNITED STATES PATENTS 1,626,420  4/1927  Mills.

FOREIGN PATENTS 342,083  10/1921  Germany.
602,475  9/1934  Germany.
870,219  3/1953  Germany.

RICHARD C. PINKHAM, *Primary Examiner.*

LOUIS J. BOVASSO, *Examiner.*